(12) United States Patent
Zemenchik et al.

(10) Patent No.: US 9,224,306 B2
(45) Date of Patent: Dec. 29, 2015

(54) SOIL BEHAVIOR SIMULATOR FOR AGRICULTURAL IMPLEMENT BLADES

(71) Applicant: CNH America LLC, New Holland, PA (US)

(72) Inventors: Robert A. Zemenchik, Kenosha, WI (US); Matthew Huenemann, Racine, WI (US)

(73) Assignee: CNH Industrial America LLC, New Holland, PA (US)

( * ) Notice: Subject to any disclaimer, the term of this patent is extended or adjusted under 35 U.S.C. 154(b) by 287 days.

(21) Appl. No.: 13/680,960

(22) Filed: Nov. 19, 2012

(65) Prior Publication Data

US 2013/0143191 A1 Jun. 6, 2013

Related U.S. Application Data

(60) Provisional application No. 61/563,214, filed on Nov. 23, 2011.

(51) Int. Cl.
*G09B 9/00* (2006.01)
(52) U.S. Cl.
CPC ........................................ *G09B 9/00* (2013.01)

(58) Field of Classification Search
CPC ................ E02F 5/00; E02F 7/00; A01C 7/00; A01C 7/107; A01C 7/102; A10C 9/00; A01D 1/00
See application file for complete search history.

(56) References Cited

U.S. PATENT DOCUMENTS

| | | | | |
|---|---|---|---|---|
| 2,618,083 | A | * | 11/1952 | Armington et al. ............. 37/389 |
| 4,483,197 | A | | 11/1984 | Kellner |
| 5,132,791 | A | * | 7/1992 | Wertz et al. ..................... 348/88 |
| 5,938,071 | A | | 8/1999 | Sauder |
| 7,086,269 | B2 | | 8/2006 | Sauder et al. |
| 7,313,976 | B2 | | 1/2008 | Swain et al. |
| 7,568,392 | B1 | | 8/2009 | Koike et al. |
| 2010/0037807 | A1 | | 2/2010 | Henning et al. |
| 2011/0290043 | A1 | | 12/2011 | Lehman et al. |

FOREIGN PATENT DOCUMENTS

SU 637527 12/1978

* cited by examiner

*Primary Examiner* — Timothy A Musselman
(74) *Attorney, Agent, or Firm* — Rebecca L. Henkel

(57) ABSTRACT

A soil behavior simulator is provided that includes a particle recirculation system configured to flow particulate material along an agricultural implement blade, and a drive unit configured to drive the agricultural implement blade in rotation.

20 Claims, 4 Drawing Sheets

SOIL BEHAVIOR SIMULATOR FOR AGRICULTURAL IMPLEMENT BLADES

CROSS REFERENCE TO RELATED APPLICATION

This application claims priority from and the benefit of U.S. Provisional Application Ser. No. 61/563,214, entitled "SOIL BEHAVIOR SIMULATOR FOR AGRICULTURAL IMPLEMENT BLADES", filed Nov. 23, 2011, which is hereby incorporated by reference in its entirety.

BACKGROUND

The invention relates generally to ground working equipment, such as agricultural equipment, and more specifically, to a soil behavior simulator for agricultural implement blades.

It is well known that to attain the best agricultural performance from a piece of land, a farmer must cultivate the soil, typically through a tilling operation. Common tilling operations include plowing, harrowing, and sub-soiling. Modern farmers perform these tilling operations by pulling a tilling implement behind a motorized tractor. Depending on the crop selection and the soil conditions, a farmer may need to perform several tilling operations at different times over a crop cycle to properly cultivate the land to suit the crop choice. In one type of tilling operation, rows of blades are pulled through soil to break up clods or lumps of soil, as well as old plant material to provide a more amenable soil structure for planting and to level the soil surface.

As will be appreciated, a variety of blade configurations may be utilized to effectively till the soil. For example, a particular blade configuration may be selected based on soil composition, soil condition and/or a desired degree of tillage. To test the effectiveness of a blade configuration, the selected blades are attached to an implement, and the implement is pulled through a field. The performance of the blades may be evaluated based on high-speed photography of the resultant soil movement and/or a post-tillage analysis of the soil. Unfortunately, the process of manufacturing a sufficient number of blades for an implement, running the implement through a field, and analyzing the resultant data may be excessively time-consuming, thereby increasing the costs associated with blade development/selection. In addition, once a desirable blade configuration is established/selected, it may be difficult to demonstrate the effectiveness of the blades to consumers. For example, consumers may be unable to witness the blades in operation within a field, and pictures of the blades in operation may not effectively convey the performance to the consumers.

BRIEF DESCRIPTION

In one embodiment, a soil behavior simulator includes a particle recirculation system configured to flow particulate material along an agricultural implement blade, and a drive unit configured to drive the agricultural implement blade in rotation.

In another embodiment, a soil behavior simulator includes a frame configured to support multiple agricultural implement blades, and a drive unit configured to drive the agricultural implement blades in rotation. The soil behavior simulator also includes a particle recirculation system configured to flow particulate material to at least one chute that directs the particulate material to the agricultural implement blades. In addition, the soil behavior simulator includes a housing having multiple transparent panels configured to facilitate viewing of an interaction between the agricultural implement blades and the particulate material.

In a further embodiment, a soil behavior simulator includes a particle recirculation system configured to flow particulate material along an agricultural implement blade, and a drive unit configured to drive the agricultural implement blade in rotation. The soil behavior simulator also includes a control system communicatively coupled to the particle recirculation system and to the drive unit. The control system is configured to selectively engage the particle recirculation system, and to adjust a rotational speed of the drive unit to simulate a desired implement speed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
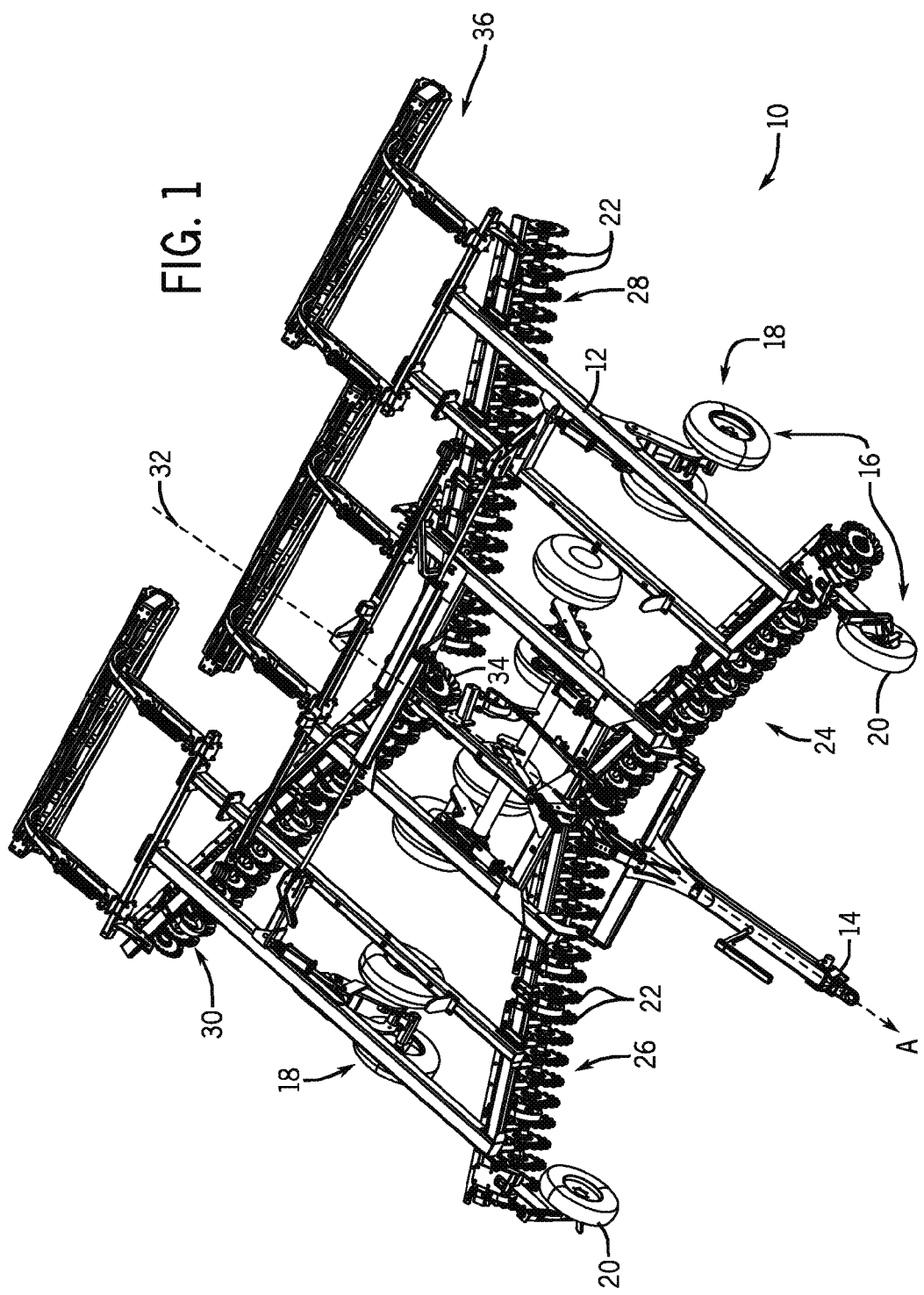
FIG. 1 is a perspective view of an exemplary agricultural implement.

Turning now to the drawings, FIG. 1 is a perspective view of an exemplary agricultural implement 10. While a vertical tilling implement 10 is shown and described below, it should be appreciated that the soil behavior simulator may be used to evaluate and/or to demonstrate the effectiveness of soil engaging blades of other suitable agricultural implements. As will be appreciated, an agricultural vehicle is configured to pull the vertical tilling implement 10 in a direction of motion A. The vertical tilling implement 10 includes a main frame 12. The main frame 12 has a hitch 14 on the front end that may be used to connect the vertical tilling implement 10 to the agricultural vehicle, such as a tractor or other prime mover. Additionally, a set of wheels 16 is connected to the main frame 12. The set of wheels 16 is oriented in a direction that is in general alignment with the direction of motion A. The set of wheels 16 includes a set of center wheels 18 and a set of pivoting wheels 20. The set of center wheels 18 is attached across the main frame 12 at positions, for example, roughly midway between the front and rear ends of the main frame 12. The set of center wheels 18 may include a system for adjusting the distance between the main frame 12 and the set of center wheels 18. This system for adjusting may permit the set of center wheels 18 to be statically fixed during the movement of the vertical tilling implement 10 or to be dynamically adjustable as the vertical tilling implement 10 travels. The set of pivoting wheels 20 is connected to the front distal ends of the main frame 12, and may reduce the amount of lateral and/or vertical movement of the vertical tilling implement 10 as it is pulled.

The vertical tilling implement 10 also includes multiple rows of fluted-concave blades 22 attached to the main frame 12. In certain configurations, the rows of fluted-concave blades 22 are indexed. In particular, the rows of fluted-concave blades 22 include a front left row 24, a front right row 26, a rear left row 28, and a rear right row 30. When indexed, the front left row 24 and the front right row 26 are aligned with the rear left row 28 and the rear right row 30 such that areas of ground between the blades in the front left row 24 and the front right row 26 are engaged by the blades in the rear left row 28 and the rear right row 30 as the tilling implement is pulled forward.

In the illustrated embodiment, the front left row 24 is symmetric about a centerline 32 of the vertical tilling implement 10 with the front right row 26. Likewise, the rear left row 28 is symmetric about the centerline 32 of the vertical tilling implement 10 with the rear right row 30. Additionally, the front left row 24 is substantially symmetric about a line perpendicular to the direction of motion A with the rear left row 28. Likewise, the front right row 26 is substantially symmetric about a line perpendicular to the direction of motion A with the rear right row 30. These general symmetries may involve some of the rows being offset relative to the others to achieve the indexing of the blades as described above.

When the rows of concave blades 22 are arranged in a symmetrical arrangement about the centerline 32, such as illustrated in FIG. 1, a gap between each side of the symmetrical rows may be created. A center tilling member 34 may be placed in this gap to ensure that all the soil passing under the vertical tilling implement 10 is tilled as the tilling implement is pulled forward. The center tilling member 34 may be a coulter, as shown in FIG. 1, another fluted blade, or the like.

While four rows of fluted-concave blades 22 are employed in the illustrated embodiment, it should be appreciated that more or fewer rows may be utilized in alternative embodiments. Additionally, while the illustrated embodiment shows the rows of fluted-concave blades 22 having an x-shaped configuration based on the described symmetry, the rows of fluted-concave blades 22 may have a different configuration. For example, the rows of fluted-concave blades 22 may have a diamond configuration, a k-shaped configuration, or all may be parallel with each other in a direction perpendicular to the direction of motion A. Furthermore, it is contemplated that some or all of the rows may be configured in asymmetric arrangements.

Rolling basket assemblies 36 are connected to the rear end of the main frame 12 to provide downward pressure. As will be appreciated, the rolling basket assemblies 36 may be replaced with any other acceptable member that is capable of exerting a desired downward pressure, including drag harrows, and the like. Although FIG. 1 shows three rolling basket assemblies 36, two of which having rotational axes which are not collinear with the third, the rolling basket assemblies 36 may include fewer or more members providing downward force.

As discussed in detail below, a soil behavior simulator may be employed to evaluate and/or to demonstrate the effectiveness of the fluted-concave blades 22. In certain embodiments, the soil behavior simulator includes a particle recirculation system configured to flow particulate material along an agricultural implement blade, and a drive unit configured to drive the agricultural blade in rotation. As the blade rotates, contact between the blade and the particulate material (e.g., soil simulation material) lofts the particles upwardly and rearwardly relative to the blade. By observing the trajectory of the particles, the performance of the blade may be evaluated without testing the blade in the field, thereby increasing the efficiency of the blade design/testing process. In addition, the effectiveness of a particular blade configuration may be shown to a large number of viewers simultaneously, thereby effectively demonstrating the soil working ability of the blade.

While the implement 10 shown and described below utilizes generally circular fluted-concave blades, it should be appreciated that alternative implements may employ other blade configurations. For example, certain implements may include fluted blades having no concavity (i.e., substantially flat). Alternative implements may include smooth-edged concave blades, i.e., blades having no flutes. Yet further implements may employ wavy blades, flat blades, or other blade configurations. In addition, certain implements may utilize a combination of blades. Because the soil behavior simulator is configured to accommodate a variety of blade profiles, the soil behavior simulator may be utilized to evaluate and/or to demonstrate the performance of each blade configuration described above, or other suitable blade configurations.

Figure 2:
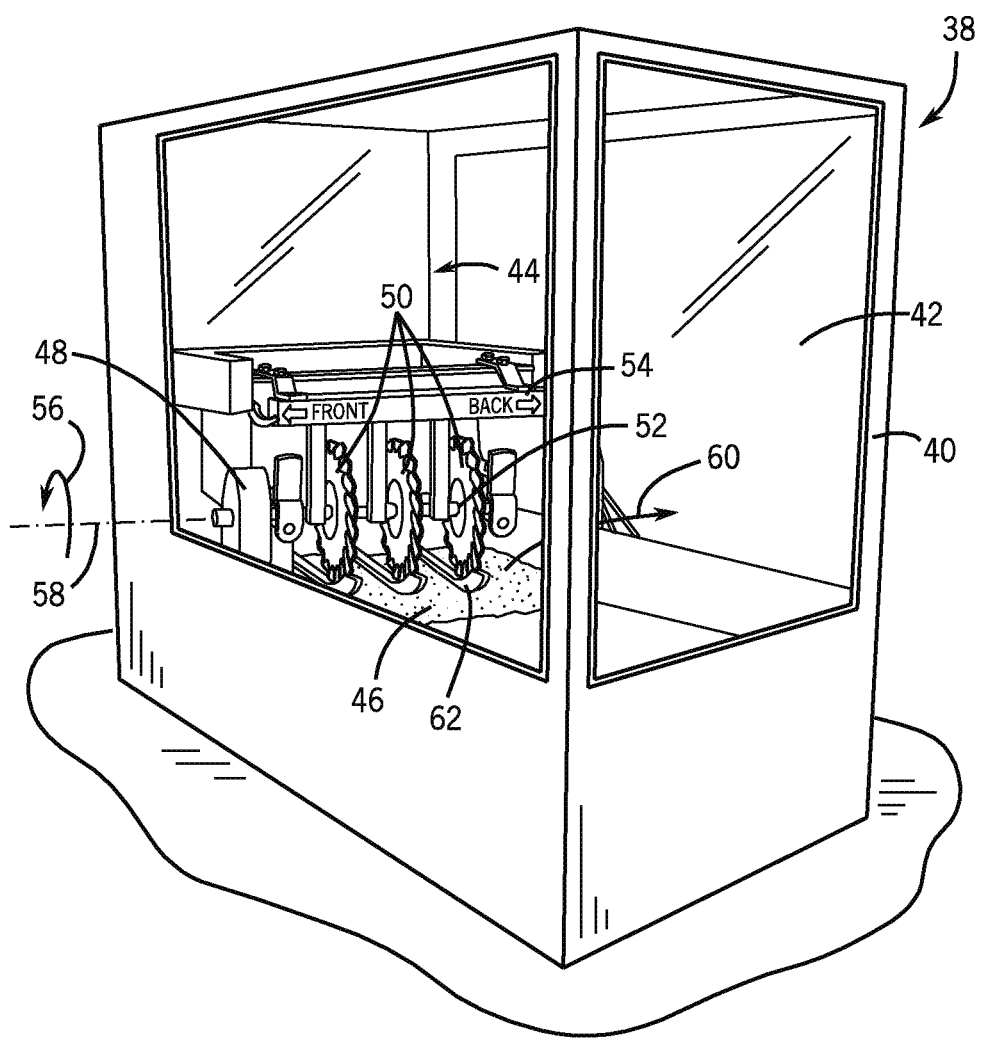
FIG. 2 is a perspective view of an embodiment of a soil behavior simulator for agricultural implement blades.

FIG. 2 is a perspective view of an embodiment of a soil behavior simulator 38 for agricultural implement blades. The soil behavior simulator 38 provides an accurate representation of soil movement in response to interaction with rotating agricultural implement blades, thereby facilitating evaluation and/or demonstration of various blade configurations. As illustrated, the soil behavior simulator 38 includes a housing 40 having multiple transparent panels 42 to facilitate viewing of the interaction between the agricultural implement blades and a particulate material (e.g., soil simulation material). In the illustrated embodiment, the transparent panels (e.g., glass, polycarbonate, acrylic, etc.) are supported by a metal framework, and enable a viewer to observe the blade/particulate material interaction from a variety of perspectives. As will be appreciated, the size and shape of the housing 40 may be particularly selected to accommodate various blade configurations/sizes, blade rotational speeds and/or blade quantities.

As discussed in detail below, the soil behavior simulator 38 includes a particle recirculation system 44 configured to flow particulate material 46 along the agricultural implement blades. In the illustrated embodiment, the particle recirculation system 44 is substantially concealed within solid panels of the housing 40 to provide a desirable appearance. The particle recirculation system 44 is configured to receive particulate material 46 discharged from the blades, and to flow the particulate material to chutes that return the particulate material to the blades. In this manner, a substantially continuous stream of particulate material 46 may flow along the blades, thereby facilitating continuous operation of the simulator 38.

The soil behavior simulator 38 also includes a drive unit 48 configured to drive the agricultural implement blades 50 in rotation. As will be appreciated, the drive unit may be an electric, hydraulic or pneumatic motor, for example. The drive unit 48 is coupled to a shaft 52, and the blades 50 are keyed to the shaft 52. As a result, rotation of the drive unit 48 induces the blades 50 to rotate. In the illustrated embodiment, the shaft 52 is supported by a frame 54 disposed within the housing 40. The frame 54 is configured to orient the agricultural implement blades 50 at an angle substantially equal to the blade angle of the simulated implement. For example, the blades 50 may be oriented at about 0 to about 30 degrees, about 5 to about 25 degrees, about 10 to about 20 degrees, or about 18 degrees. As will be appreciated, selecting an angle that corresponds to the blade angle of the simulated implement enhances the accuracy of the blade evaluation/demonstration process. In the illustrated embodiment, the frame 54 includes labels indicating the front side of the blades 50, and the back side of the blades. These labels enable viewers to observe the variation in soil interaction between each side of the blades 50.

As the drive unit 48 rotates the blades 50 in a direction 56 about a rotational axis 58, the particulate material 46 is discharged from the blades in a direction 60. The particulate material 46 may be particularly selected to simulate a desired soil density and/or composition. For example, in certain embodiments, the particulate material 46 includes substantially spherical particles having a diameter of about 6 mm. In addition, each particle may have a mass of about 0.1 to about 0.5 grams, about 0.15 to about 0.45 grams, or about 0.2 to about 0.4 grams. By way of example, the mass of each particle may be about 0.12 grams. However, it should be appreciated that the diameter, mass and/or shape of each particle may vary in alternative embodiments to simulate a desired soil density/composition.

In the illustrated embodiment, paddles 62 are employed to simulate a desired soil firmness. As illustrated, a paddle 62 is disposed adjacent to each lateral side of each agricultural implement blade 50. The paddles 62 are configured to direct the particulate material 46 toward the blades 50 to simulate soil firmness. In certain embodiments, the paddles 62 may be composed of a resilient material, such as flexible plastic or rubber, to establish a particle pressure against each blade 50. Furthermore, it should be appreciated that the position of each paddle, and the flexibility of each paddle may be particularly selected to simulate a desired soil firmness.

As discussed in detail below, movement of the particulate material 46 discharged from the agricultural implement blades 50 may be monitored to determine the effectiveness and/or to evaluate the performance of the blades. For example, the maximum height and/or the trajectory of the particles discharged from the blades may be analyzed and/or compared to particle trajectories of other blade configurations. In this manner, blade performance may be measured within a controlled environment. For example, in certain embodiments, particle movement may be captured by video and/or a series of photographs for slow-motion analysis. Such analysis may be used to establish a model of particle movement in response to a particular blade configuration, and/or to demonstrate the effectiveness of the blade configuration to consumers. In addition, the soil behavior simulator 38 provides an opportunity for viewers to directly observe the performance of a particular blade without traveling to a field to witness an implement in operation. As a result, blade performance may be demonstrated to a large number of viewers simultaneously.

In certain embodiments, a rear view of a tractor may be displayed above the frame 54 to provide the appearance of pulling an implement through a field. In such embodiments, lights may be coupled to the back panel of the housing 40 to simulate marker lights on the tractor, thereby providing a desirable visual appearance. In addition, sound insulting material (e.g., foam, fiberglass, etc.) may be disposed within the housing 40 to substantially reduce the noise of the particle recirculation system 44, thereby facilitating quiet operation of the soil behavior simulator 38. Furthermore, the housing 40 may include a variety of panels to facilitate access to various components within the simulator 38. In such embodiments, the panels may include locking mechanisms to block unauthorized access to the components. In further embodiments, the soil behavior simulator 38 may be portable to facilitate transportation to a desired site. In such embodiments, the housing 40 may include openings that enable a forklift to move the simulator 38. Alternatively, wheels (e.g., castors) may be coupled to the bottom of the housing 40.

Figure 3:
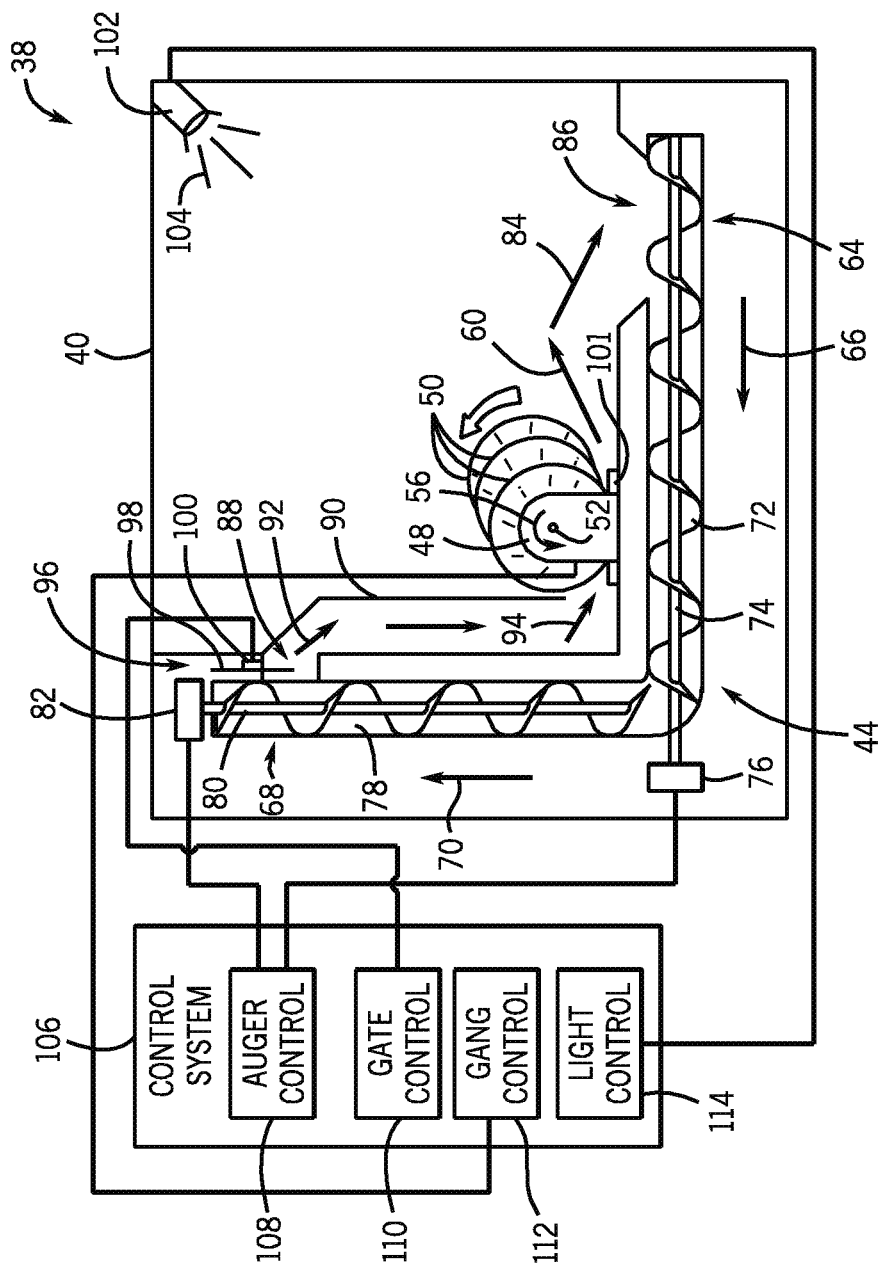
FIG. 3 is a schematic view of an embodiment of a soil behavior simulator.

FIG. 3 is a schematic view of an embodiment of a soil behavior simulator 38. As previously discussed, the soil behavior simulator 38 includes a particle recirculation system 44 configured to flow particulate material along the agricultural implement blades 50. In the illustrated embodiment, the recirculation system 44 includes a first auger assembly 64 configured to receive particulate material discharged from the blades 50, and to flow the particulate material in a direction 66. The particle recirculation system 44 also includes a second auger assembly 68 configured to receive the particulate material from the first auger assembly 64, and to flow the particulate material in a direction 70. In the illustrated embodiment, the first auger assembly 64 is oriented substantially horizontally, and the second auger assembly 68 is oriented substantially vertically. However, it should be appreciated that the auger assemblies 64 and 68 may be oriented in other directions in alternative embodiments.

In the illustrated embodiment, the first auger assembly 64 includes an auger 72 and a shaft 74. The shaft 74 is coupled to a drive unit 76 (e.g., an electric, pneumatic, or hydraulic motor) configured to induce the shaft 74 to rotate. In this configuration, as the drive unit 76 rotates the auger 72, via rotation of the shaft 74, the particulate material is conveyed in the direction 66 toward the second auger assembly 68. Similarly, the second auger assembly 68 includes an auger 78 and a shaft 80. The shaft 80 is coupled to a drive unit 82 (e.g., an electric, pneumatic, or hydraulic motor) configured to induce the shaft 80 to rotate. In this configuration, as the drive unit 82 rotates the auger 78, via rotation of the shaft 80, the particulate material is conveyed upwardly in the direction 70.

By way of example, particulate material discharged from the blades 50 flows in a direction 84 toward an opening 86 within a floor of the housing 40. The auger assemblies 64 and 68 then convey the particulate material to an opening 88 within a chute 90. The particulate material flows through the opening in a direction 92, and then downwardly through the chute 90 and toward the agricultural implement blades 50 in a direction 94. Contact between the rotating blades 50 and the particulate material induces the material to flow in the direction 60. The particulate material then falls toward the opening 86 in the direction 84, where the process repeats. While the illustrated embodiment includes a single chute 90 configured to direct the particulate material to the blades 50, it should be appreciated that alternative embodiments may include multiple chutes configured to individually direct the particulate material to each blade 50.

In the illustrated embodiment, a gate assembly 96 is disposed between the second auger assembly 68 and the chute 90. As illustrated, the gate assembly 96 includes a retractable gate 98, and an actuator 100. The actuator 100 (e.g., hydraulic cylinder, pneumatic cylinder, electromechanical device, etc.) is configured to adjust a position of the gate 98 to control the flow of particulate material through the chute 90. Consequently, the gate assembly 96 may precisely regulate the flow of particulate material to the blades 50, thereby accurately simulating a desired soil composition and/or desired soil conditions.

As illustrated, a wear plate 101 is positioned beneath the agricultural implement blades 50 to establish a desired depth of the particulate material relative to the blades 50. The wear plate 101 is configured to be removable, thereby enabling the plate to be replaced when a surface of the plate becomes worn. Consequently, the depth of the particulate material relative to the blades may be maintained at a substantially constant level. In certain embodiments, the wear plate 101 may be made from a polymeric material, such as polyamide (e.g., nylon).

The illustrated soil behavior simulator 38 also includes a light source 102 directed toward the agricultural implement blades 50. The light source is configured to emit light 104, thereby highlighting the particulate material discharged from the blades 50. In the illustrated embodiment, a single light source is employed to illuminate the discharged particulate material. However, it should be appreciated that alternative embodiments may include additional light sources to provide a desired lighting effect. For example, certain embodiments may include 2, 3, 4, 5, 6 or more light sources directed toward the blades 50. Further embodiments, may employ additional light sources disposed about the periphery of the housing 40 to illuminate desired regions of the particulate material flow and/or desired structures of the simulator 38. For example, a row of colored lights may extend along the interior of the housing 40 to establish a glowing effect that increases the visual appeal of the simulator 38.

In the illustrated embodiment, the soil behavior simulator 38 includes a control system 106 configured to adjust various parameters associated with operation of the simulator 38. As illustrated, the control system 106 includes an auger control 108 communicatively coupled to the drive unit 76 of the first auger assembly 64, and to the drive unit 82 of the second auger assembly 68. The auger control 108 is configured to selectively engage the particle recirculation system 44 when the simulator 38 is in operation. In certain embodiments, the auger control 108 may be configured to adjust a speed of the first and second auger assemblies 64 and 68 to control a flow rate of particulate material to the agricultural implement blades 50. In addition, the control system 106 includes a gate control 110 communicatively coupled to the actuator 100, and configured to adjust a position of the retractable gate 98. As previously discussed, the position of the gate 98 may be adjusted to establish a desired flow rate of particulate material to the blades 50. Consequently, the gate control 110 may adjust the position of the gate 98 to simulate a desired soil composition and/or desired soil conditions.

Furthermore, the control system 106 includes a gang control 112 communicatively coupled to the drive unit 48, and configured to adjust a rotational speed of the blades 50. Consequently, the rotational speed of the blades 50 may be adjusted to simulate a desired implement speed. For example, the rotational speed may be selected to simulate an implement speed of about 2 to about 10 mph, about 3 to about 9 mph, or about 4 to about 8 mph. By way of example, the gang control 112 may instruct the drive unit 48 to rotate the blades 50 at a rotational speed corresponding to an implement speed of about 5.5 mph, or about 8.5 mph. In this manner, blade performance may be evaluated and/or observed over a wide range of implement speeds. In addition, the control system 106 includes a light control 114 communicatively coupled to the light source 102, and configured to selectively instruct the light source 102 to emit light 104. In certain embodiments, the light control 114 may be configured to instruct the light source 102 to vary the luminous intensity of the light 104 to achieve a desired lighting effect.

Figure 4:
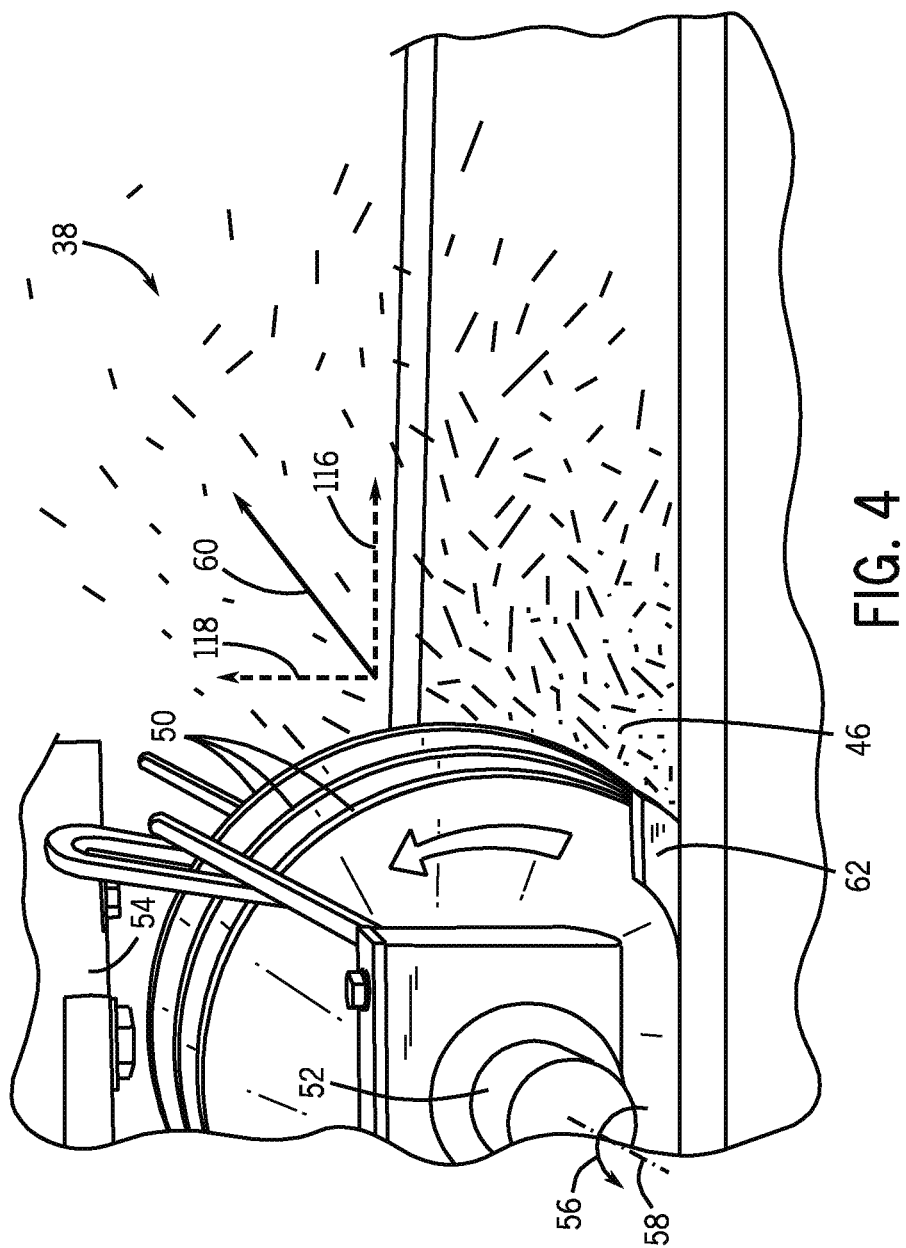
FIG. 4 is a detailed perspective view of the soil behavior simulator of FIG. 1 in operation.

FIG. 4 is a detailed perspective view of the soil behavior simulator 38 of FIG. 1 in operation. As illustrated, rotation of the agricultural implement blades 50 in the direction 56 induces the particulate material to flow in the direction 60. For example, the blades may apply a force to each particle sufficient to establish a horizontal acceleration 116 and a vertical acceleration 118, thereby lofting the particle upwardly and rearwardly relative to the blades 50. By observing the trajectory of the particles, the performance of the blades 50 may be evaluated without testing the blades in the field, thereby increasing the efficiency of the blade design/testing process. In addition, the effectiveness of a particular blade configuration may be shown to a large number of viewers simultaneously, thereby effectively demonstrating the soil working ability of the blade.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A soil behavior simulator, comprising:
    a particle recirculation system configured to receive particulate material discharged from an agricultural implement blade, to direct the particulate material toward the agricultural implement blade, and to flow the particulate material along the agricultural implement blade; and
    a drive unit configured to drive the agricultural implement blade in rotation.

2. The soil behavior simulator of claim 1, comprising a housing having a plurality of transparent panels configured to facilitate viewing of an interaction between the agricultural implement blade and the particulate material.

3. The soil behavior simulator of claim 1, wherein the particle recirculation system comprises:
    a first auger assembly configured to receive the particulate material discharged from the agricultural implement blade; and
    a second auger assembly configured to receive the particulate material from the first auger assembly, and to deliver the particulate material to a chute that directs the particulate material to the agricultural implement blade.

4. The soil behavior simulator of claim 3, wherein the first auger assembly is substantially horizontal, and the second auger assembly is substantially vertical.

5. The soil behavior simulator of claim 3, comprising a retractable gate disposed between the second auger assembly and the chute, wherein the retractable gate is configured to control a flow of the particulate material to the agricultural implement blade.

6. The soil behavior simulator of claim 1, comprising a removable wear plate positioned beneath the agricultural implement blade to establish a desired depth of the particulate material relative to the blade.

7. The soil behavior simulator of claim 1, wherein a rotational speed of the drive unit is adjustable to simulate a desired implement speed.

8. The soil behavior simulator of claim 1, comprising a pair of paddles, wherein each paddle is disposed on an opposite lateral side of the agricultural implement blade, and the pair of paddles is configured to direct the particulate material toward the agricultural implement blade to simulate soil firmness.

9. The soil behavior simulator of claim 1, wherein the particulate material comprises a plurality of substantially spherical particles, wherein a diameter of each particle is approximately 6 mm, and a weight of each particle is between about 0.1 to about 0.5 grams.

10. The soil behavior simulator of claim 1, comprising a light source directed toward the agricultural implement blade, and configured to highlight the particulate material discharged by the agricultural implement blade.

11. The soil behavior simulator of claim 1, comprising a frame configured to support the agricultural implement blade.

12. A soil behavior simulator, comprising:
    a particle recirculation system configured to receive particulate material discharged from an agricultural implement blade, to direct the particulate material toward the agricultural implement blade, and to flow the particulate material along the agricultural implement blade;
    a drive unit configured to drive the agricultural implement blade in rotation; and
    a control system communicatively coupled to the particle recirculation system and to the drive unit, wherein the control system is configured to selectively engage the particle recirculation system, and to adjust a rotational speed of the drive unit to simulate a desired implement speed.

13. The soil behavior simulator of claim 12, wherein the particle recirculation system comprises:
a first auger assembly configured to receive the particulate material discharged from the agricultural implement blade; and
a second auger assembly configured to receive the particulate material from the first auger assembly, and to deliver the particulate material to a chute that directs the particulate material to the agricultural implement blade.

14. The soil behavior simulator of claim 13, comprising a retractable gate disposed between the second auger assembly and the chute, wherein the retractable gate is communicatively coupled to the control system, and the control system is configured to control a flow of the particulate material to the agricultural implement blade by adjusting a position of the gate.

15. The soil behavior simulator of claim 12, comprising a light source directed toward the agricultural implement blade, and configured to highlight the particulate material discharged by the agricultural implement blade, wherein the light source is communicatively coupled to the control system, and the control system is configured to selectively activate the light source.

16. The soil behavior simulator of claim 12, comprising a housing having a plurality of transparent panels configured to facilitate viewing of an interaction between the agricultural implement blade and the particulate material.

17. A soil behavior simulator, comprising:
a particle recirculation system configured to flow particulate material along an agricultural implement blade;
a drive unit configured to drive the agricultural implement blade in rotation; and
a removable wear plate positioned beneath the agricultural implement blade to establish a desired depth of the particulate material relative to the blade.

18. The soil behavior simulator of claim 17, comprising a housing having a plurality of transparent panels configured to facilitate viewing of an interaction between the agricultural implement blade and the particulate material.

19. The soil behavior simulator of claim 17, wherein the particle recirculation system comprises:
a first auger assembly configured to receive the particulate material discharged from the agricultural implement blade; and
a second auger assembly configured to receive the particulate material from the first auger assembly, and to deliver the particulate material to a chute that directs the particulate material to the agricultural implement blade.

20. The soil behavior simulator of claim 17, comprising a pair of paddles, wherein each paddle is disposed on an opposite lateral side of the agricultural implement blade, and the pair of paddles is configured to direct the particulate material toward the agricultural implement blade to simulate soil firmness.

* * * * *